Dec. 7, 1965  W. G. WING  3,221,563
SUSPENSION APPARATUS
Filed July 10, 1961  2 Sheets-Sheet 1
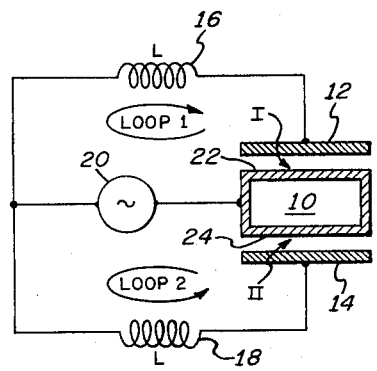
FIG.1.
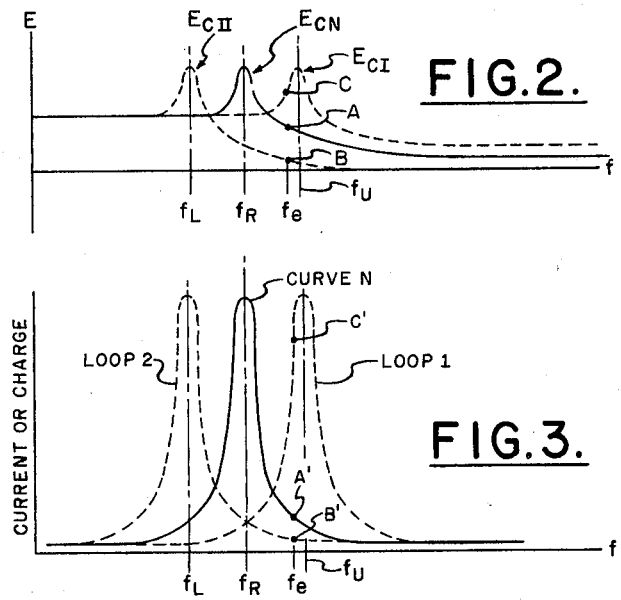
FIG.2.
FIG.3.
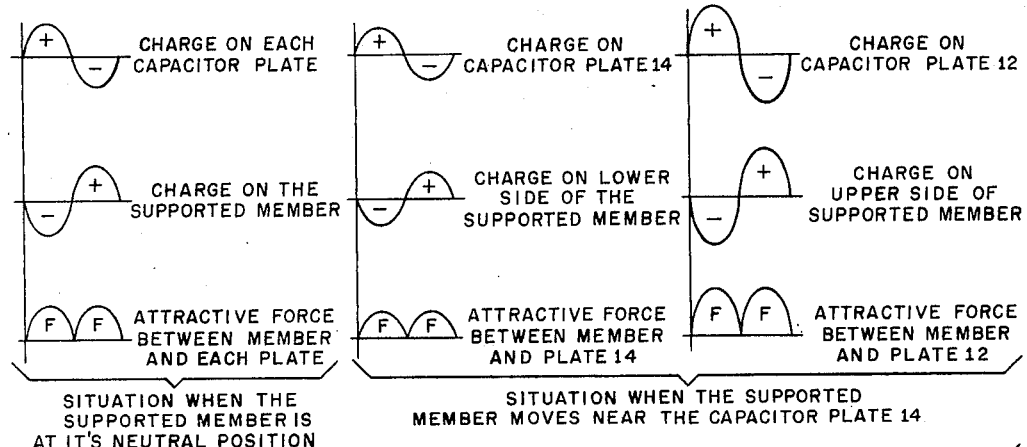
FIG.4.
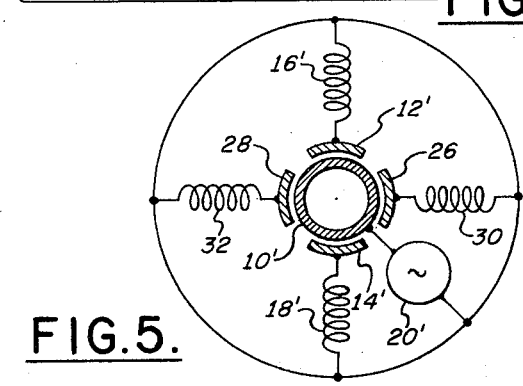
FIG.5.
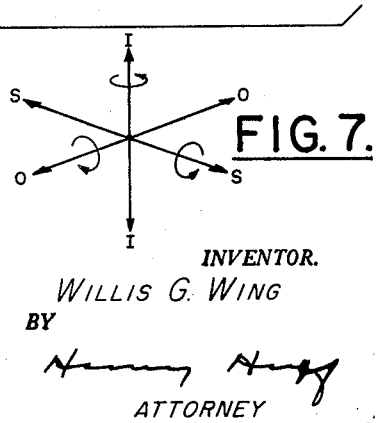
FIG.7.
INVENTOR.
WILLIS G. WING
BY
ATTORNEY

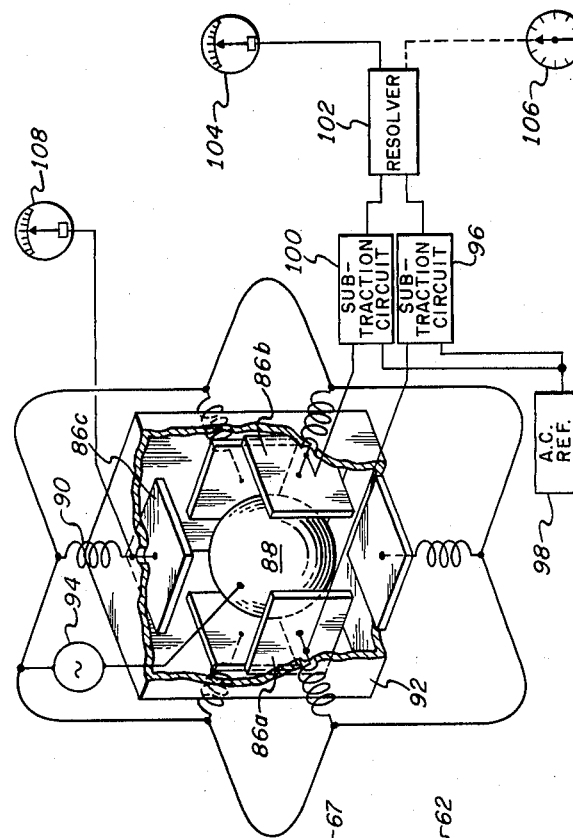
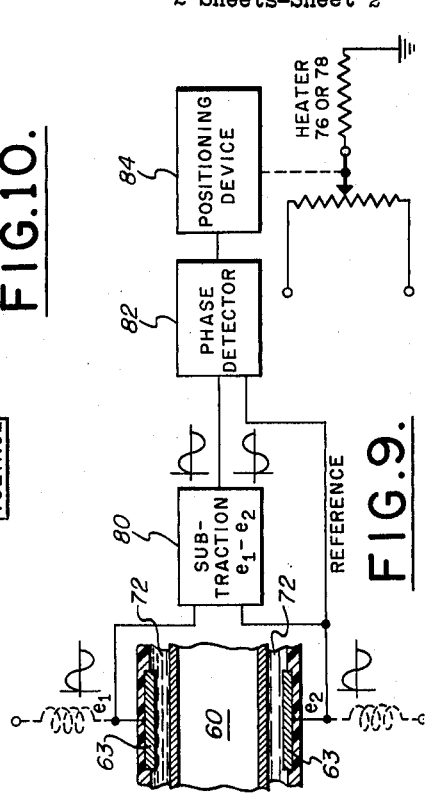
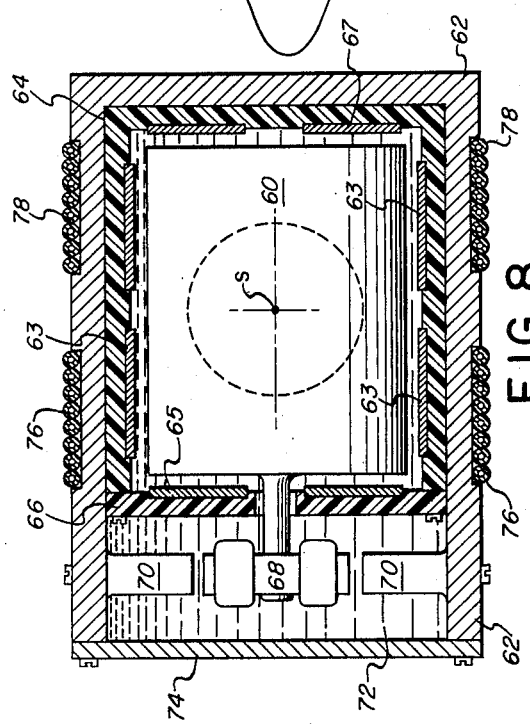
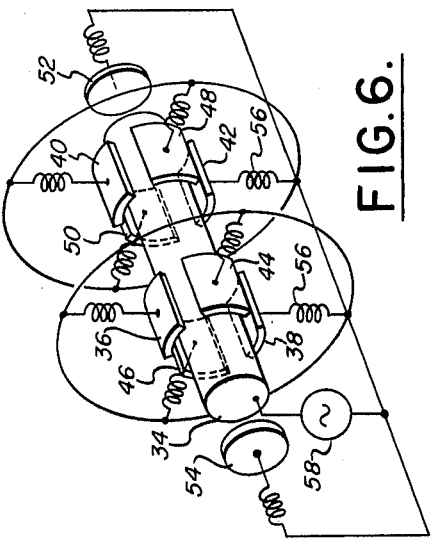
INVENTOR.
WILLIS G. WING
BY
ATTORNEY

United States Patent Office 3,221,563
Patented Dec. 7, 1965

3,221,563
SUSPENSION APPARATUS
Willis G. Wing, Glen Head, N.Y., assignor to Sperry Rand Corporation, Great Neck, N.Y., a corporation of Delaware
Filed July 10, 1961, Ser. No. 122,708
17 Claims. (Cl. 73—516)

This invention relates generally to apparatus that supports other apparatus and, more particularly, to apparatus for supporting such other apparatus by electrostatic forces, whereby the need for physical contact between the supporting and supported apparatus is obviated. Because the present invention eliminates the need for a supporting structure to touch physically a supported structure, it is particularly useful in supporting members that move in response to inertial forces, there never being error-producing friction between those members and other parts when the invention is employed.

Support, or suspension, of an element by electrostatic forces can be provided by either attractive or repulsive forces, the latter being usually more preferable. To provide suspension by means of electrostatic repulsive forces, the element to be suspended is positioned among several conductive members and D.C. potentials of the same sense are applied to the members and to the element. This causes the element to be repelled continually to some neutral position among the members and be there suspended. To provide suspension by means of electrostatic attractive forces, D.C. potentials of the same sense are applied to the members, but a D.C. potential of the opposite sense is applied to the element, thereby causing the element to be attracted to all members. With the element so positioned among the members that the attractive forces of the members on the element are equal, the element remains fixed in space, i.e. suspended. However, if the element moves from its neutral position, an imbalance of forces occurs, thereby causing the element to slam against the member to which it is attracted by the greatest force. For this reason, repulsive techniques, as stated above, are usually employed.

The present invention departs from the ordinarily preferred use of electrostatic forces of repulsion to suspend an element and employs instead electrostatic forces of attraction. With the present invention, equal forces of attraction on the suspendable element are produced normally by the members, i.e. equal forces are produced so long as the element is at a neutral position among the members. However, as the element moves from its neutral position toward one of the members, the force of attraction between that member and the element is made to decrease; in addition the force of attraction between the element and the member away from which it is moving is made to increase, thereby causing the element to return to its neutral position. To provide such varying electrostatic forces of attraction, the present invention makes a further departure from the prior art by employing, not D.C. potentials, but A.C. potentials, such use of A.C. potentials to be described in detail later.

A principal object of the invention is to provide apparatus for suspending an element by means of electrostatic forces.

Another object of the invention is to provide apparatus for supporting an element by means of electrostatic forces of attraction, such forces being produced by A.C. potentials.

Another object of the invention is to provide an electrostatic suspension system for use with a floated component, movement of which is responsive to inertial forces.

Another object of the invention is to provide apparatus for controlling the temperature of a flotation fluid employed with a floated, electrostatically supported component that is responsive to inertial forces.

Another object of the invention is to provide an accelerometer responsive to measure accelerations along three orthogonal axes.

The invention will be described with reference to the figures wherein:

FIG. 1 is a schematic diagram of apparatus embodying the invention,

FIGS. 2, 3, and 4, are diagrams useful in describing the invention,

FIG. 5 is a schematic diagram of a form of the invention,

FIG. 6 is a schematic diagram of another form of the invention,

FIGURE 7 is a diagram useful in describing the apparatus of FIG. 6,

FIG. 8 is a cross sectional view of a floated gyroscope employing the invention, FIG. 9 is a block diagram of a heater control circuit for the flotation fluid of the gyroscope of FIG. 8, and FIG. 10 is a schematic diagram of an accelerometer embodying the invention.

Referring to FIG. 1, an element 10 adapted to be suspended by electrostatic forces is positioned between two conductive plates 12 and 14. The outer shell of the element 10 is conductive. Consequently, the upper face 22 of the element 10 and the plate 12 form one capacitor I, and the under face 24 and the plate 14 form a second capacitor II. Coils 16 and 18 are connected respectively to the plates 12 and 14; the coils 16 and 18 have substantially the same inductance. A constant frequency alternating current source 20, e.g. a crystal controlled oscillator, is connected at one end to the element 10 and at its other end to the coils 16 and 18.

The capacitor I and the coil 16 together form a series resonant circuit designated loop 1; the capacitor II and the coil 18 together form a second series resonant circuit designated loop 2. The frequency of the A.C. source 20 is greater than the resonant frequencies of loops 1 and 2 when the element 10 is neutrally positioned, i.e. when the element 10 is so positioned that the resonant frequencies of loops 1 and 2 are equal.

With the element 10 neutrally positioned between the plates 12 and 14, the voltage vs. frequency curves for capacitors I and II will be the same. For example, in FIG. 2, the voltages developed across the capacitors I and II as the frequency of the source 20 is varied are shown by the solid line $E_{CN}$. The frequency designated $f_R$ is the resonant frequency of loops 1 and 2 (when the element 10 is neutrally positioned); the frequency designated $f_e$ is the excitation frequency, i.e. the frequency of the alternating current source 20. With such neutral positioning of the element 10, the voltages developed across the capacitors I and II (at the excitation frequency $f_e$) are indicated by the point A on the curve $E_{CN}$.

When the element 10 departs from its neutral position and starts to approach the plate 14, the resonant frequency of loop 1 increases to a frequency $f_U$ because the capacitance of the capacitor I decreases. Similarly, the resonant frequency of loop 2 decreases to a frequency $f_L$ because the capacitance of the capacitor II increases. With such shifts in the resonant frequencies of loops 1 and 2, the voltages developed across the capacitors I and II respectively increase and decrease to the values indicated by the points C and B on the curves $E_{CI}$ and $E_{CII}$.

Referring to FIG. 3, the resonance curve for both loops 1 and 2 when the element 10 is positioned neutrally is curve N, such curve indicating that peak currents flow in the loops when they are excited at their resonant frequencies $f_R$. Movement of the element 10 toward the plate 14 shifts the resonance curves for the loops 1 and 2 so that their respective peaks reside at frequencies $f_U$ and $f_L$, thereby causing the current in loop 2 to decrease slightly from a normal value A' to B' and the current in loop 1 to increase enormously to a value C'.

FIG. 4 shows the development of attractive forces for both loops 1 and 2. As the plates 12 and 14 go positive, the faces 22 and 24 go negative; as the plates 12 and 14 go negative, the faces 22 and 24 go positive. This has the effect of producing pulsating forces of attraction between the element 10 and both the upper and lower plates 12 and 14. FIG. 4 shows the effect of slight movement of the element 10 from its neutral position toward the plate 14, i.e. FIG. 4 shows a slight decrease in the charges on the face 24 and the plate 14 and a considerable increase in the charges on the plate 12 and the face 22; such nonlinearity in the increase and decrease of charge causes the plate away from which the element 10 is moving to exhibit a greater attractive force than the plate toward which the element is moving.

Referring to FIG. 5, the concept embodied in the vertical suspension apparatus of FIG. 1 is extended to provide both lateral and vertical suspension of an element 10', the plates 12' and 14' providing vertical suspension and the plates 26 and 28 providing lateral suspension. Coils 16', 18', 30 and 32, being connected to the capacitors consisting of the plates 12', 14', 26 and 28 and the element 10' respectively, form therewith series resonant circuits. An alternating current source 20' having a frequency greater than the resonant frequencies of the aforementioned resonant circuits when the resonant frequencies of those circuits are equal is connected to the element 10' and the coils 16', 18', 30 and 32. Movement of the element 10' vertically causes increasing and decreasing forces of attraction between the element 10' and the plates 12' and 14' as described above; lateral movement of the element 10 similarly causes increasing and decreasing forces of attraction between the element 10' and the plates 26 and 28.

FIGS. 6 and 7, show the concept embodied in FIG. 1 being extended still further to restrict a cylinder 34 to only rotation about its longitudinal axis O (see FIG. 7). Plates 36 and 40 and plates 38 and 42 cooperate to provide vertical suspension. Likewise, plates 44 and 48 and plates 46 and 50 cooperate to provide lateral suspension of the cylinder 34. Axial movement of the cylinder 34 is prevented by the plates 52 and 54. Rotation of the cylinder 34 about its axis I (see FIG. 7) is prevented by cooperation between the plate pair 44 and 50 and the plate pair 46 and 48. Rotation of the cylinder 34 about its axis S (see FIG. 7) is prevented by cooperation between the plate pair 36 and 42 and the plate pair 38 and 40. Coils 56 are provided to form series resonant circuits (as described above), all of which are excited above resonance by an A.C. source 58.

FIG. 8 shows the form of the invention of FIG. 7 being employed with a floated gyroscope of the type shown and described in U.S. Patent 2,752,791. A gyroscope housing 60, hereinafter called a "float," contains a gyroscope, the rotor of which is shown by dashed lines. The spin axis of the rotor is designated S. The float 60, which must be of an electrically conductive material, is encased within an outer housing 62, such housing being provided with a nonconductive liner 64, e.g. a liner made of glass. Conductive plates 63 are secured to the liner 64; also secured to the liner 64 is an annular conductive plate 67. A cover 66 having an annular conductive plate 65 is secured to the liner 64 after the float 60 is placed within the liner 64. Coils and an A.C. source (neither of which is shown) are adapted to be connected to the conductive plates to provide suspension forces as described earlier. Secured to the float is the rotor 68 of a combined torquer and pickoff such as is described in application S.N. 32,780, filed in the name of Robert H. Bolton, and assigned to the present assignee; the stator 70 of the combined torquer and pick-off is secured to the housing 62. A flotation fluid 72, preferably having a high dielectric constant, occupies all available space within the housing 62; a cover 74 is secured to the housing 62 to prevent leakage of the flotation fluid 72. Surrounding the housing are two heater coils 76 and 78, the functions of which are to control the flotation fluid temperature so that its density will remain constant throughout and thereby exert a constant buoyant force on the float 60 equal to the force of gravity.

By use of a flotation fluid with the aforedescribed electrostatic suspension, the following advantages are gained: damping of the movement of the float is increased; the magnitude of the excitation voltage may be decreased because of the high dielectric constant of the medium between respective conductive plates and the float 60 and because the fluid itself acts as the primary source of suspension forces; arcing between elements is quashed by the fluid.

Temperature control of the flotation fluid 72 by the heaters 76 and 78 may be afforded by sensing the directions that the voltages on certain plates change. For example, as the float of FIG. 8 descends toward the bottom of the housing 62, e.g. when the float density is greater than the fluid density, the voltages on the lower conductive plates decrease and the voltages on the upper conductive plates increase. Likewise, should the float 60 rise to the top of the housing 62, e.g. when the flotation fluid density is greater than the float density, the voltages on the upper plates decrease whereas the voltages on the lower plates increase. The apparatus of FIG. 9 shows schematically two opposing suspension plates 63 cooperating to position the float 60 within the housing 62, both plates having applied thereto A.C. voltages of the same phase relationship. The voltages on the plates are applied to a susbtraction circuit 80 which produces no output signal so long as both voltages have the same magnitude. When the magnitude of one voltage increases, the magnitude of the other voltage decreases, thereby causing the subtraction circuit to have an A.C. output voltage (the phase of which depends on which voltage increased and which voltage decreased). The output signal from the subtraction circuit 80 is applied to a phase detector 82 which also receives a reference voltage. The phase detector output signal is applied to a positioning device 84 that varies, in proportion to the magnitude and sense of the detector output signal, the voltage applied to the heater 76 or 78: Should the float rise within the fluid 72, the voltage applied to the heater will be increased, thereby increasing the fluid temperature, decreasing the fluid density, and causing the float to sink to its proper position. Should the flotation fluid density decrease below that of the float, the opposite will occur. Since two heater coils are employed (one at each end of the housing 62) the fluid temperature will remain constant throughout.

Referring to FIG. 10, an accelerometer employing the present invention has six suspension plates 86, each of which forms one half of a capacitor consisting of the plate itself and the face of a spherical mass 88. Preferably, the mass 88 has only a conductive outer shell, but may be conductive throughout. Each capacitor, as in all of the aforedescribed apparatus, is connected in series with a coil 90 to form a series resonant circuit. Each plate 86 is supported by a housing 92 which, preferably, also contains a flotation fluid. The mass 88 is connected to one end of an alternating current source 94 and the other end of that source is connected to the coils 90. The frequency of exictation, as before, is above the resonant frequencies of the resonant circuits when those resonant frequencies are equal. A subtraction circuit 96 receives the signal on the plate 86a and a signal from an A.C. source 98. The source 98 provides a signal equal in magnitude (and of the same phase) as the signal on the plate 86a when the mass is positioned neutrally. Therefore, the subtraction circuit 96 normally has no output signal. Similarly, the signal on the plate 86b and the signal from the source 98 are applied to a subtraction circuit 100. When the mass 88 moves to and from the plates 86a and 86b (in response to lateral acceleration of the housing 92), the subtraction circuits 96 and 100 produce A.C. signals proportional to such movement, the signals having phases dependent upon whether the signals on the plates 86a and 86b increase or decrease.

A resolver 102, e.g. the resolver shown and described in the Massachusetts Institute of Technology, Radiation Laboratory Series, Volume 17, page 342, receives the output signals from the subtraction circuits 96 and 100 and vectorially adds those signals to drive a meter 104 and indicator 106. The meter 104 indicates the magnitude of acceleration; the indicator 106 indicates the direction of acceleration. The voltage on the plate 86c is applied to a meter 108 to indicate the magnitude and direction of the vertical acceleration, the meter being adapted to read "zero acceleration" when the mass is neutrally located: Accelerations in ascent move the mass further from the plate 86c, thereby causing an increased voltage to be applied to the meter 108; accelerations in descent cause the mass to approach the plate 86c; thereby causing the voltage applied to the meter 108 to decrease.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for suspending a chargeable element comprising first chargeable means, second chargeable means, a first inductor connected to said first chargeable means, a second inductor connected to said second chargeable means, an alternating current source one end of which is connected to the inductors and the other end of which is connected to the element being suspended, said element being adapted to be positioned between said chargeable means whereby first and second capacitors are provided, each capacitor consisting of said element and one of said chargeable means, said first capacitor being in series with said first inductor to form a first series resonant circuit and said second capacitor being in series with said second inductor to form a second series resonant circuit, said alternating current source being of a frequency that is greater than the resonant frequencies of both said series resonant circuits when those resonant frequencies are equal and being such that the current in one circuit is greater than the curent in the other circuit when those resonant frequencies are not equal, said chargeable element being positionable between said chargeable means when the resonant frequencies are unequal solely by electrostatic forces between the element and both said chargeable means.

2. Apparatus for supporting a conductive element by electrostatic forces comprising an alternating current source one end of which is connected to said element, first and second inductors connected to the free end of said alternating current source, first and second chargeable members adapted to have said element supported therebetween, each member being electrically connected to the free end of a different one of said inductors and forming one half of a capacitor consisting of the member itself and the supportable element, each said capacitor being serially connected to an inductor forms therewith a series resonant circuit, the resonant frequency of each series resonant circuit being varied as the supportable element changes its position between the chargeable members, said alternating source being of a frequency that is greater than the resonant frequency of each said series resonant circuit when those resonant frequencies are the same and being such that the current in one resonant circuit is more than the current in the other resonant circuit when the resonant frequencies of those circuits are not the same, said supportable element when the resonant frequencies are different being positionable between said chargeable members solely by electrostatic forces between said element and said members.

3. Apparatus for supporting one chargeable member between two other chargeable members comprising first and second inductive means connected in parallel with each other and being each connected to a different supporting chargeable member, and an alternating current source connected between said parallel connected inductive means and the supportable member, said alternating current source having a frequency greater than the resonant frequency of the series resonant circuit consisting of the inductance of the first inductive means and the capacitance between the member to which it is connected and the supportable member and the resonant frequency of the series resonant circuit consisting of the inductance of the second inductive means and the capacitance between the member to which it is connected and the supportable member when both series resonant circuits have the same resonant frequency said alternating current source frequency being however such that the current in one resonant circuit is greater than the current in the other circuit when the resonant frequencies are not equal and said supportable member being positionable between the chargeable members by electrostatic forces only when said resonant frequencies are unequal.

4. Apparatus for suspending a chargeable element comprising a plurality of chargeable members, an equal number of inductors each of which is electrically connected to a different chargeable member, an alternating current source one end of which is connected to the inductors and the other end of which is connected to the element being suspended, said element being adapted to be positioned within a volume bounded by said plurality of chargeoble members whereby a plurality of capacitors are provided, each consisting of said element and one of said chargeable members, each capacitor being in series with one inductor to form a plurality of series resonant circuits, said alternating current source being of a frequency greater than the resonant frequencies of all said series resonant circuits when those resonant frequencies are identical and being always such that the current in one circuit is less than the current in the other circuits when the resonant frequencies of those circuits are not identical, said chargeable element being positionable within said volume solely by electrostatic forces when all said series resonant circuits do not have the same resonant frequency.

5. Apparatus for supporting a conductive element by electrostatic forces comprising an alternating current source one end of which is connected to said element, a plurality of inductors connected to the free end of said alternating current source, a plurality of chargeable members adapted to have said element supported within a volume that they bound, each member being electrically connected to the free end of a different one of said inductors and forming one half of a capacitor consisting of the member itself and the supportable element, each said capacitor being serially connected to an inductor forms therewith a series resonant circuit, the resonant frequency of each series resonant circuit being varied as the supportable element changes its position within said volume, said alternating source being of a frequency that is greater than the resonant frequency of each said series resonant circuit when those resonant frequencies are all equal and being such that the current in one resonant circuit is less than the current in all such other resonant circuits when the resonant frequencies of those circuits are not all equal, said conductive element being positionable within said volume solely by electrostatic forces when all said series resonant circuits do not have the same resonant frequency.

6. Gyroscope support apparatus comprising a chargeable gyroscope housing, means containing said gyroscope housing having dimensions slightly larger than said gyroscope housing, a plurality of chargeable members electrically insulated from each other and supported by said containing means apart from said gyroscope housing, an equal number of inductors each of which is electrically connected to a different chargeable member, an alternating current source one end of which is connected to the inductors and the other end of which is connected to the gyroscope housing, said gyroscope housing and said plurality of chargeable members forming a plurality of capacitors with the gyroscope housing being a common conductor to all capacitors, said capacitors being in series with said inductors form a plurality of series resonant circuits, substantially nonconductive fluid of the same density as said gyroscope housing contained within the space between said housing and said containing means, and said alternating current source being of a frequency that is higher than the resonant frequencies of all said series resonant circuits when those resonant frequencies are equal but not such that the currents in the circuits are equal even though their respective resonant frequencies are different, said gyroscope housing being positionable within said containing means solely by electrostatic forces when all said series resonant circuits do not have the same frequency.

7. Apparatus for supporting a gyroscope comprising a conductive housing adapted to contain said gyroscope, a second housing dimensionally larger than and containing said gyroscope housing, an alternating current source one end of which is connected to said gyroscope housing, a plurality of inductive means connected to the free end of said alternating current source, a plurality of conductive members insulated from each other and supported by said second housing apart from said gyroscope housing, each conductive member being electrically connected to the free end of a different one of said inductive means and forming one half a capacitor consisting of the member itself and said housing containing said gyroscope housing, each said capacitor being serially connected with an inductive means forms therewith a series resonant circuit, the resonant frequency of each series resonant circuit being varied as the housing adapted to contain said gyroscope changes position within the larger housing, said alternating current source being of a frequency that is greater than the resonant frequency of each said series resonant circuit when the resonant frequencies of those circuits are equal and never such that the currents in the resonant circuits are all simultaneously the same even though their respective resonant frequencies are not equal, said gyroscope housing being positionable within said second housing by means of electrostatic forces alone when said series resonant circuits have resonant frequencies which are not all the same.

8. Apparatus for supporting a gyroscope comprising a conductive housing adapted to contain said gyroscope, a second housing dimensionaly larger than said gyroscope housing, substantially nonconductive fluid means contained within the space between both said housings, said fluid means being of the same density as said housing adapted to contain said gyroscope, an alternating current source one end of which is connected to said gyroscope housing, a plurality of inductive means connected to the free end of said alternating current source, a plurality of conductive members insulated from each other and supported by said second housing apart from said gyroscope housing, each conductive member being electrically connected to the free end of a different one of said inductive means and forming one half a capacitor consisting of the member itself and said housing adapted to contain said housing, each said capacitor being serially connected with an inductive means forms therewith a series resonant circuit, the resonant frequency of each series resonant circuit being varied as the housing adapted to contain said gyroscope changes position within said second housing, said alternating current source being of a frequency that is greater than the resonant frequency of each said series resonant circuit when the resonant frequencies of those circuits are equal and never such that the currents in the resonant circuits are all simultaneously the same even though their respective resonant frequencies are not equal, said gyroscope housing being positionable within said second housing by means of electrostatic forces alone when said series resonant circuits have resonant frequencies which are all not the same.

9. An accelerometer comprising a plurality of conductive means, each conductive means being insulated from the others, a conductive mass contained within a volume bounded by said conductive means to form a plurality of capacitors each consisting of said mass as one conductor and one of the conductive means as the other conductor, means supporting said conductive means adapted to be secured within a vehicle, an alternating current source one end of which is connected to said mass, a plurality of inductors each of which is connected to a different conductive means to form series resonant circuits with the capacitors of which said conductive means are part, said series resonant circuits all having a certain resonant frequency when said mass is at a certain position within said volume, said alternating current source being connected to the free ends of all said inductors and being of a frequency greater than said certain resonant frequency, said source frequency being such that the currents in each resonant circuit are unequal when the respective resonant frequencies of those circuits are unequal and means to measure and resolve the relative movement between said mass and each of said conductive means when the vehicle in which said supporting means is secured moves to indicate the magnitude and direction of the acceleration of the vehicle, said conductive mass being repositioned within said volume by electrostatic forces when all said series resonant circuits do not have the same resonant frequency.

10. An accelerometer comprising a plurality of conductive means, each conductive means being insulated from the others, a conductive mass contained within a volume bounded by said conductive means to form a plurality of capacitors each consisting of said mass as one conductor and one of the conductive means as the other conductor, means supporting said conductive means adapted to be secured within a vehicle, an alternating current source one end of which is connected to said mass, a plurality of inductors each of which is connected to a different conductive means to form series resonant circuits with the capacitors of which said conductive means are part, all said series resonant circuits having a certain resonant frequency when said mass is at a certain position within said volume, said alternating current source being connected to the free ends of all said inductors and being of a frequency greater than said certain resonant frequency, said source frequency being such that the currents in each resonant circuit are unequal when the respective resonant frequencies of those circuits are unequal and means to measure and resolve the changing voltages across said capacitors when the vehicle in which said supporting means is secured moves to provide an indication of the magnitude and direction of the acceleration of the vehicle, said conductive mass being repositioned within said volume by electrostatic forces when all said series resonant circuits do not have the same resonant frequency.

11. An accelerometer comprising a plurality of conductive means, each conductive means being insulated from the others, a mass contained within a volume bounded by said conductive means to form a plurality of capacitors each consisting of said mass as one conductor and one of the conductive means as the other conductor, said mass having a conductive outer shell and a nonconductive core, means supporting said conductive means adapted to be secured within a vehicle, an alternating current source one end of which is connected to said mass, a plurality of inductors each of which is connected to a different conductive means to form series resonant circuits with the capacitors of which said conductive means are part, each of said series resonant circuits having a certain resonant frequency when said mass is at a certain position within said volume, said alternating current source being connected to the free ends of all said inductors and being of a frequency greater than said certain resonant frequency, said source frequency being such that the currents in each resonant circuit are unequal when the respective resonant frequencies of those circuits are unequal and means to measure and resolve the changing voltages across said capacitors when the vehicle in which said supporting means is secured moves to provide an indication of the magnitude and direction of the acceleration of the vehicle, said conductive mass being repositioned within said volume by electrostatic forces when all said series resonnant circuits do not have the same resonant frequency.

12. An accelerometer comprising a plurality of conductive means, each conductive means being insulated from the others, a mass contained within a volume bounded by said conductive means to form a plurality of capacitors each consisting of said mass as one conductor and one of the conductive means as the other conductor, said mass having a conductive outer shell and a nonconductive core, means containing and supporting said conductive means adapted to be secured within a vehicle, nonconductive fluid in said containing and supporting means, an alternating current source one end of which is connected to said mass, a plurality of inductors each of which is connected to a different conductive means to form series resonant circuits with the capacitors of which said conductive means are part, each said series resonant circuit having a certain resonant frequency when said mass is at a certain position within said volume, said alternating current source being connected to the free ends of all said inductors and being of a frequency greater than said certain resonant frequency, said source frequency being such that the currents in each resonant circuit are unequal when the respective resonant frequencies of those circuits are unequal and means to measure and resolve the changing voltages that appear across said capacitors when the vehicle in which said supporting means is secured moves to provide an indication of the magnitude and direction of the acceleration of the vehicle, said conductive mass being repositioned within said volume by electrostatic forces when all said series resonant circuits do not have the same resonant frequency.

13. An accelerometer comprising a chargeable mass, a plurality of chargeable members, a plurality of inductors each of which is connected respectively to a chargeable member, an alternating current source one end of which is connected to the inductors and the other end of which is connected to the mass, said mass being adapted to be positioned within a volume bounded by said plurality of chargeable members whereby a plurality of capacitors are provided, each capacitor consisting of said mass and one of said chargeable members and being in series with one inductor to form a plurality of series resonant circuits, said alternating current source being of a frequency greater than the resonant frequencies of all said series resonant circuits when those resonant frequencies are identical, said source frequency being such that the currents in each resonant circuit are unequal when the respective resonant frequencies of those circuits are unequal and means to measure the amount said mass moves from the position it has when all said series resonant circuits have the same resonant frequency, said chargeable mass being repositioned within said volume by electrostatic forces when all said series resonant circuits do not have the same resonant frequency.

14. Gyroscope support apparatus comprising a chargeable gyroscope housing, means containing said gyroscope housing having dimensions slightly larger than said gyroscope housing, a plurality of chargeable members electrically insulated from each other and supported by said containing means apart from said gyroscope housing, an equal number of inductors each of which is electrically connected to a different chargeable member, an alternating current source one end of which is connected to the inductors and the other end of which is connected to the gyroscope housing, said gyroscope housing and said plurality of chargeable members forming a plurality of capacitors with the gyroscope housing being a common conductor to all capacitors, said capacitors being in series with said inductors from a plurality of series resonant circuits, fluid of the same density as said gyroscope housing contained within the space between said housing and said containing means, said alternating current source being of a frequency that is higher than the resonant frequencies of all said series resonant circuits when those resonant frequencies are equal and being such that the current in one resonant circuit is less than the current in all such other resonant circuits when the resonant frequencies of those circuits are not all equal, and means for controlling the temperature of said fluid comprising a heater, and means when the voltage on a chargeable member exhibiting an upward suspension force is greater than a quiescent value to decrease the fluid temperature and when that voltage is below the quiescent value to increase the fluid temperature.

15. Apparatus for supporting a gyroscope comprising a conductive housing adapted to contain said gyroscope, a second housing dimensionally larger than said gyroscope housing, fluid means contained within the space between both said housings, said fluid means being of the same density as said housing adapted to contain said gyroscope, an alternating current source one end of which is connected to said gyroscope housing, a plurality of inductive means connected to the free end of said alternating current source, a plurality of conductive members insulated from each other and supported by said second housing apart from said gyroscope housing, each conductive member being electrically connected to the free end of a different one of said inductive means and forming one half a capacitor consisting of the member itself and said housing adapted to contain said housing, each said capacitor being serially connected with an inductive means forms therewith a series resonant circuit, the resonant frequency of each series resonant circuit being varied as the housing adapted to contain said gyroscope changes position within said second housing, and means for controlling the temperature of said fluid comprising a heater, and means responsive when the voltage on a conductive member exhibiting an upward suspension force is greater than a quiescent value to decrease the fluid temperature and when that voltage is below the quiescent value to increase the fluid temperature, said alternating current source being of a frequency that is greater than the resonant frequency of each said series resonant circuit when the resonant frequencies of those circuits are equal but not of such a frequency that the currents in the circuits are equal even though their respective resonant frequencies are different.

16. In an accelerometer, in combination, a reference mass having a conductive surface, and means for suspending said mass in a reference position comprising a plurality of plates disposed about said mass and comprising pairs located on three mutually perpendicular reference axes, said plates forming variable capacitors with said surface, and an energizing circuit for each capacitor comprising in series a source of voltage of predetermined frequency, an inductor having a reactance greater than the reactance of the capacitor at said frequency, and the capacitor, whereby the voltage across each inductor is a measure of the acceleration applied to said mass along the reference axis associated with the inductor.

17. In an accelerometer, a tubular reference mass having a conductive surface, a support, an annulus of spaced conductive plates mounted adjacent and parallel to said surface on said support, said plates comprising a group exerting no resultant force on said mass when equally spaced therefrom and excited with equal potentials with respect to said conductive surface, and an energizing circuit for each plate comprising in series the plate, said conductive surface, a source of alternating voltage, and an inductor having a reactance larger than the reactance of the capacitor formed by the plate and surface at the frequency of the source.

References Cited by the Examiner

UNITED STATES PATENTS

| | | | |
|---|---|---|---|
| 1,589,039 | 6/1926 | Kaempfe | 73—504 X |
| 2,316,915 | 4/1943 | Truman | 73—517 X |
| 2,942,479 | 6/1960 | Hollmann | 73—517 X |
| 3,003,356 | 10/1961 | Nordsieck | 74—5 |

FOREIGN PATENTS 1,062,965  8/1959  Germany.

RICHARD C. QUEISSER, *Primary Examiner.*

J. E. WEST, A. BLUM, JOSEPH P. STRIZAK, JAMES J. GILL, *Examiners.*